(12) United States Patent
Sattler

(10) Patent No.: US 8,342,751 B2
(45) Date of Patent: Jan. 1, 2013

(54) GUIDE RAIL WITH A COVER STRIP FOR A LINEAR BEARING

(75) Inventor: Michael Sattler, Wattweiler (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 639 days.

(21) Appl. No.: 12/280,458

(22) PCT Filed: Feb. 19, 2007

(86) PCT No.: PCT/EP2007/051557
§ 371 (c)(1),
(2), (4) Date: Sep. 12, 2008

(87) PCT Pub. No.: WO2007/096329
PCT Pub. Date: Aug. 30, 2007

(65) Prior Publication Data
US 2009/0257692 A1   Oct. 15, 2009

(30) Foreign Application Priority Data
Feb. 24, 2006   (DE) .......................... 10 2006 008 677

(51) Int. Cl.
*F16C 33/00* (2006.01)
*F16C 29/06* (2006.01)
(52) U.S. Cl. .......................................... 384/15; 384/45
(58) Field of Classification Search ................. 384/15, 384/43–45; 277/438, 551, 558, 567, 925
See application file for complete search history.

(56) References Cited

U.S. PATENT DOCUMENTS

| 5,106,205 A | 4/1992 | Coron |
| 6,502,988 B2 * | 1/2003 | Koch et al. ................. 384/15 |
| 6,749,338 B2 * | 6/2004 | Schmidt ..................... 384/15 |

FOREIGN PATENT DOCUMENTS

| DE | 101 53 016 A | | 5/2003 |
| DE | 102004006902 | * | 9/2005 |
| EP | 0 784 167 A | | 7/1997 |
| EP | 1 184 584 A | | 3/2002 |
| JP | 33-010310 | | 11/1958 |
| JP | 004-099445 U | | 8/1992 |
| JP | 2002089558 A | | 3/2002 |

\* cited by examiner

*Primary Examiner* — James Pilkington
(74) *Attorney, Agent, or Firm* — Lucas & Mercanti, LLP; Klaus P. Stoffel

(57) ABSTRACT

The guide rail has a longitudinal groove arranged along its upper rail side and a cover strip which closes off the groove and bears flush against the plane of the upper rail side. The spacing between opposite groove walls of the groove is smaller than the leveled cover strip. In order to retain the cover strip, each of the groove walls are provided with an undercut and retaining strips provided at both longitudinal sides of the cover strip engage into the undercuts. The cover strip is plastically curved around an axis which is parallel to the guide rail, such that the curved cover strip is smaller than the spacing between the groove walls, and after being inserted into the longitudinal groove, the curved cover strip is leveled by means of plastic deformation, such that the retaining strips are displaced into the undercuts.

6 Claims, 1 Drawing Sheet

GUIDE RAIL WITH A COVER STRIP FOR A LINEAR BEARING

FIELD OF THE INVENTION

The present invention relates to a guide rail for a linear bearing. In the case of linear bearings, guide carriages are mounted in a longitudinally displaceable manner on a guide rail. The guide rails are generally fitted on a framework or engine bed.

BACKGROUND OF THE INVENTION

For example, DE 101 53 016 A1 has disclosed an arrangement of a cover strip on a linear guide. The guide rail has bores for fastening screws, with a cover strip being inserted into a longitudinal groove of the guide rail. The groove walls of the longitudinal groove have undercuts. Material lips of the cover strip are pressed into said undercuts by means of deformation. This takes place by the cover strip, which is partially inserted into the longitudinal groove, being arranged entirely within the longitudinal groove by being rolled therein. The cover strip is retained in said state by means of a form-fitting connection in the regions of the undercuts in the guide groove. In order for a proper deformation of the material lips by means of the compressive forces exerted on the cover strip to be properly possible, the cover strip is formed from two layers: an upper top layer which is exposed to the surroundings is produced from a corrosion-resistant steel. A deformation layer which bears the material lips is preferably formed from high-grade aluminum. In comparison to steel, high-grade aluminum can easily be plastically deformed.

SUMMARY OF THE INVENTION

It is the object of the present invention to provide a guide rail for a linear bearing in which the cover strip is simplified in comparison to the known cover strip.

This object is achieved according to the invention in that, in order to insert the cover strip into the longitudinal groove, the cover strip is plastically curved about an axis which is parallel to the guide rail such that the extent of said cover strip transversely with respect to the longitudinal groove is smaller than the clear spacing between the groove walls, the concave side of the curved cover strip facing the longitudinal groove, and, after being inserted into the longitudinal groove, the curved cover strip being leveled by means of plastic deformation such that the retaining strips are displaced into the undercuts. The longitudinal groove and the cover strip are preferably matched to each other in such a manner that, after the leveling operation, the cover strip is leveled into the plane of the upper rail side.

One advantage can be seen in the fact that, in the case of the guide rail according to the invention, the cover strip can be of single-layered design. It is not required to provide soft retaining strips which are plastically deformable in a simple manner. By means of the plastic curvature of the cover strip per se, it is also possible to press the cover strip into the longitudinal groove with significantly reduced contact pressure forces. A further advantage is that the retaining strips can be properly matched to the undercuts such that, during the leveling of the cover strip, no additional plastic deformation at the retaining strips is required.

As seen in cross section through the cover strip, the retaining strips can each be designed as a shoulder which is matched to the groove wall and to the undercut of the longitudinal groove. The shoulder preferably comprises a high side and a transverse side arranged at an angle with respect to the high side, with a spacing between the high sides of the two retaining strips of the cover strip being matched to the clear spacing between the two groove walls of the longitudinal groove. In this development according to the invention, proper alignment of the cover strip in the longitudinal groove is ensured in an advantageous manner. The guidance of the cover strip is ensured by means of the two groove walls of the longitudinal groove. The spacing between the high sides of the two retaining strips can turn out to be somewhat smaller than the spacing between the two groove walls of the longitudinal groove. The cover strip is thereby oriented properly in the longitudinal direction of the guide rail. Furthermore, lifting away from the base of the longitudinal groove is likewise prevented by the transverse sides of the retaining strips being matched to the undercut of the longitudinal groove.

The invention is additionally directed toward a method for inserting the cover strip into the longitudinal groove, as described by the above-mentioned method steps, in which it can be considered in particular to be advantageous that the plastically curved cover strip can be leveled into the longitudinal groove with a small contact pressure force.

BRIEF DESCRIPTION OF THE DRAWINGS

The invention is explained in more detail below with reference to an exemplary embodiment which is depicted in a total of three figures, in which.

DETAILED DESCRIPTION OF THE INVENTION

Figure 1:
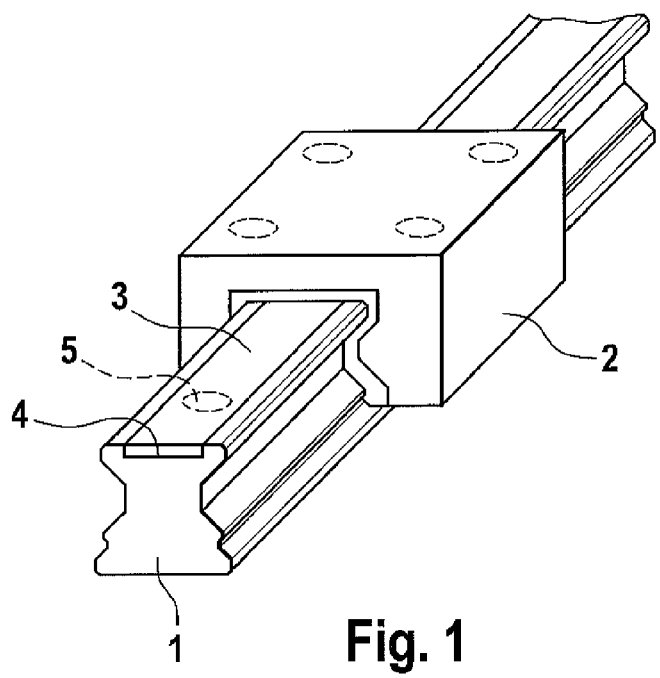
FIG. 1 shows a guide rail according to the invention for a linear bearing in a perspective illustration.

The guide rail 1 according to the invention and depicted in FIG. 1 bears a guide carriage 2 which is mounted in a longitudinally displaceable manner on the guide rail 1. The guide rail 1 is provided on its upper rail side with a cover strip 3 which is arranged in a longitudinal groove 4 and continuously contacts a base surface of the longitudinal groove 4 over the width of the cover strip 3. The cover strip 3 covers passage openings 5 for receiving fastening elements, said passage openings 5 being arranged spaced apart consecutively along the longitudinal groove 4.

Figure 2:
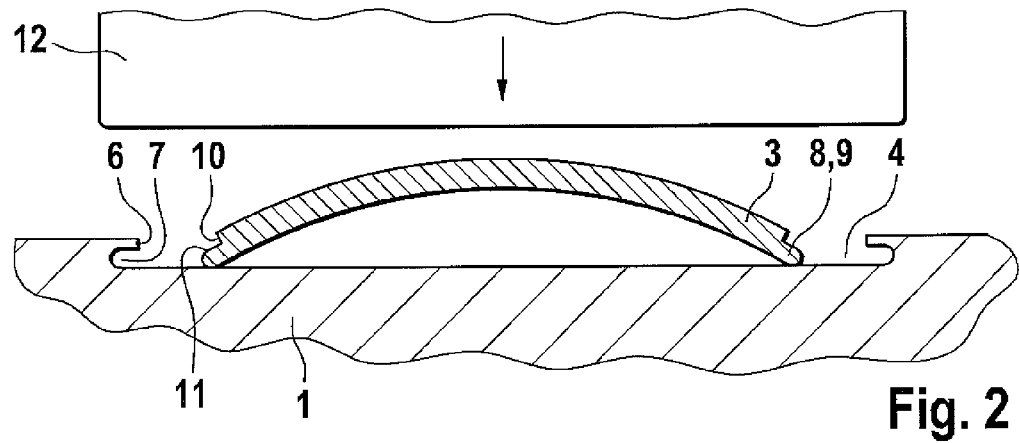
FIG. 2 shows a method step for producing the guide rail according to the invention.
Figure 3:
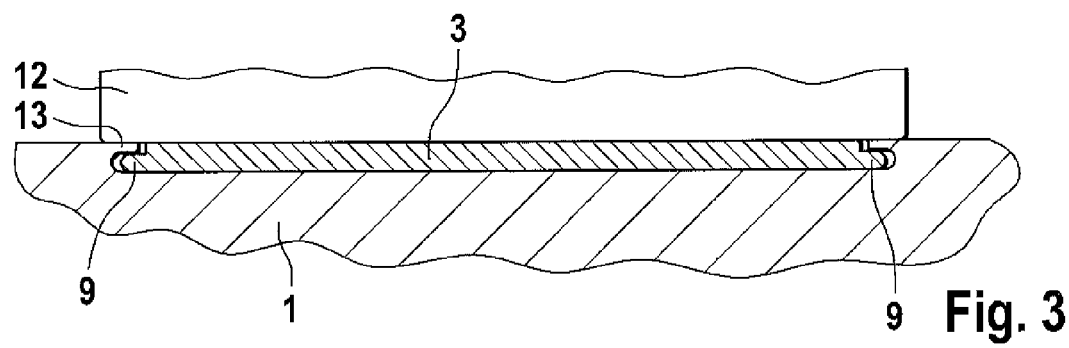
FIG. 3 shows a cutout of the guide rail according to the invention in an enlarged illustration.

The manner in which the cover strip 3 is inserted into the guide rail 1 is depicted in FIGS. 2 and 3.

The longitudinal groove 2 is bounded by opposite groove walls 6, with each groove wall 6 being provided with an undercut 7.

The cover strip 3 has a respective retaining strip 8 on its longitudinal sides. In the present exemplary embodiment, the retaining strips are each designed as a shoulder 9 which has a high side 10 and a transverse side 11 arranged at an angle with respect thereto.

FIG. 2 clearly shows a plastic curvature of the cover strip 3, with the concave side of the concave curvature facing the guide rail 1 and the longitudinal groove 4. The extent of the plastically curved cover strip 3 transversely with respect to the longitudinal groove 4 is smaller than a clear spacing between the groove walls 6 of the longitudinal groove 4.

The cover strip 3 is initially merely placed into the longitudinal groove 4. A pressure-exerting tool 12 (indicated schematically here) presses against the convex side of the plastically curved cover strip 3 until the latter has finally been leveled into the plane of the longitudinal groove 4 such that the cover strip 3 ends flush with the upper side of the rail. By plastic deformation of the plastically curved cover strip 3, the extent thereof transversely with respect to the longitudinal groove 4 becomes larger. Under said plastic deformation, the shoulders 9 of the cover strip 3 engage in the undercut 7 of the guide rail 1. It is thereby ensured that the cover strip 3 is retained properly in the longitudinal groove 4. The cover strip 3 cannot be pulled upward out of the longitudinal groove 4, since the transverse side 11 of the shoulder 9 strikes against a wall 13 of the undercut 7. A proper alignment in the longitudinal direction of the guide rail is provided by the high sides 10 of the shoulders 9 being aligned along the groove walls 6.

The cover strip 3 can be inserted in a simple manner into the longitudinal groove 4, with the cover strip being able to be placed securely in the longitudinal groove 4 and retained therein in a single working step without application of large pressing-in forces.

LIST OF REFERENCE NUMBERS

1 Guide rail
2 Guide carriage
3 Cover strip
4 Longitudinal groove
5 Passage opening
6 Groove wall
7 Undercut
8 Retaining strip
9 Shoulder
10 High side
11 Transverse side
12 Pressure-exerting tool
13 Wall

The invention claimed is:

1. A guide rail for a linear bearing, comprising:
a guide rail body having a first surface with a longitudinal groove formed in the first surface, the longitudinal groove having a base surface; and
a plastically deformed cover strip, which substantially fills the longitudinal groove and bears flush against a plane of the first surface of the guide rail body,
wherein a spacing between opposite groove walls of the longitudinal groove is smaller than a transverse width of the cover strip, which is fitted transversely into the longitudinal groove,
wherein the groove walls each have an undercut in order to secure the cover strip on the guide rail,
wherein the cover strip has retaining strips on both longitudinal sides of the cover strip, which engage in the undercuts of the groove wall, and
wherein the cover strip is initially plastically curved about an axis which is parallel to the guide rail such that the transverse width of the cover strip with respect to the longitudinal groove is smaller than the spacing between the groove walls and a bottom surface of the cover strip, which is concave, faces the longitudinal groove, and subsequently the cover strip is plastically deformed such that the cover strip continuously the base surface of the longitudinal groove over a width of the cover strip and the retaining strips are displaced into the undercuts.

2. The guide rail as claimed in claim 1, wherein each retaining strip is matched to the groove walls and to the undercuts of the longitudinal groove.

3. The guide rail as claimed in claim 2, wherein each retaining strip of the cover strip has a high side wall and a spacing between the high side wall of each retaining strip of the cover strip is matched to the spacing between the groove walls of the longitudinal groove.

4. A method for inserting a cover strip, which has retaining strips provided on longitudinal sides of the cover strip, into a longitudinal groove having a base and groove walls with undercuts in an upper surface of a guide rail of a linear bearing, the method comprising the following steps:
plastically curving the cover strip about an axis parallel to the guide rail such that the cover strip, transversely with respect to the longitudinal groove, is smaller than a spacing between the groove walls;
subsequently inserting the cover strip into the longitudinal groove with a concave side of the curved cover strip facing the longitudinal groove; and
subsequently plastically deforming the cover strip so as to level the cover strip and displace the retaining strips into the undercuts.

5. The method as claimed in claim 4, wherein the retaining strips are each designed as a shoulder which is matched to the groove wall and to the undercut of the longitudinal groove.

6. The method as claimed in claim 5, wherein the shoulder has a high side and a transverse side arranged at an angle with respect to the high side, with a spacing between the high side of each retaining strip of the cover strip being matched to the spacing between the groove walls of the longitudinal groove.

* * * * *